United States Patent [19]

Pagliuca

[11] Patent Number: 4,603,368

[45] Date of Patent: Jul. 29, 1986

[54] VOLTAGE ARRESTER WITH AUXILIARY AIR GAP

[75] Inventor: Emanuel J. Pagliuca, Patchogue, N.Y.

[73] Assignee: TII Industries, Inc., Copiague, N.Y.

[21] Appl. No.: 730,587

[22] Filed: May 6, 1985

Related U.S. Application Data

[63] Continuation of Ser. No. 519,255, Aug. 1, 1983, abandoned.

[51] Int. Cl.⁴ .......... H02H 3/22

[52] U.S. Cl. .......... 361/119; 361/124

[58] Field of Search .......... 361/119, 124, 118, 117, 361/120; 337/31, 33, 34; 313/325

[56] References Cited

U.S. PATENT DOCUMENTS

| | | | |
|---|---|---|---|
| 3,755,715 | 8/1973 | Klayum et al. . | |
| 4,132,915 | 1/1979 | Wilms | 361/124 X |
| 4,158,869 | 6/1979 | Gilberts | 361/118 |
| 4,319,300 | 3/1982 | Napiorkowski et al. | 361/119 |
| 4,320,435 | 3/1982 | Jones | 361/119 |
| 4,447,848 | 5/1984 | Smith | 361/119 X |
| 4,493,006 | 1/1985 | Lange et al. | 361/124 |
| 4,503,414 | 3/1985 | Sykes et al. | 337/31 |

*Primary Examiner*—A. D. Pellinen
*Assistant Examiner*—Jonathan Wysocki
*Attorney, Agent, or Firm*—Sachs & Sachs

[57] ABSTRACT

An overvoltage surge arrester having an auxiliary breakdown path includes an elongated conductive electrode extension device received by one terminal of a gas tube arrester which has disposed thereon a pair of graphite washers with a mica washer sandwiched therebetween and a resilient insulating washer disposed between the extension device retaining head and one of the conductive washers. The other conductive washer is in intimate electrically conductive contact with the gas tube electrode that receives the electrode extension device. The assembly forms a creepage path in parallel with the surge arrester spark gap, when inserted into a conventional conductive cage and its associated tubular cap utilized with a station protector housing.

17 Claims, 6 Drawing Figures

VOLTAGE ARRESTER WITH AUXILIARY AIR GAP

This application is a continuation of application Ser. No. 519,255 filed Aug. 1, 1983 now abandoned.

BACKGROUND OF THE INVENTION

1. Field of the Invention

The present invention relates to electrical overvoltage surge protectors, used to protect telephone transmission lines against voltage surges, and more particularly, relates to spark gap protectors providing auxiliary or backup protection in case of failure of a main gas arrester device.

2. Description of the Relevant Art

Surge arresters or station protector devices generally include an insulated housing and contain a pair of spaced apart terminals with provision for maintaining a protector cartridge between the terminals. The protector cartridge may contain a pair of spaced apart carbon electrodes or a gas tube that defines an arc or a discharge gap therebetween in order to pass to ground excessive line voltages or currents in order to protect both the equipment connected to the line and the line itself. With repeated overvoltage conditions such as lightning strikes and transients, the carbon gap loses its effectiveness and the gas tube, although much more reliable, may also fail with continued use. Failure of a gas tube may be the result of the hermetic seals used to seal the gas within the tube becoming porous, thus allowing the gas to escape. This changes the breakover voltage of the protective gas tube arrester to a value which is greater than that desired for the line. Some of these protective devices include solder discs or fusing links which melt because of the excessive heat incurred during an overvoltage transient, causing the line terminal to short to the ground terminal. Many attempts have been made to make the backup or auxiliary protective spark gap survive multiple overvoltage transients without becoming completely shorted. This enables the line to be protected and in service, although tolerating a higher breakover voltage than is normally desired. Typical of a device which provides auxiliary air gap protection is disclosed in U.S. Pat. No. 4,158,869 issued to Gilberts on June 19, 1979. The device disclosed therein provides a pair of electrodes axially aligned with the gas tube and separated by an insulating spacer to provide an air gap therebetween. The air gap is maintained at a predetermined spacing such that that the breakdown voltage thereof is greater than the rated breakdown voltage across the arc gap of the gas tube, but less than the breakdown voltage across the arc gap should the gas tube fail open as by being vented to the atmosphere.

A similar device is disclosed in U.S. Pat. No. 4,132,915 which issued to Wilms on Jan. 2, 1979. The arrangement disclosed therein permits a cage finger to grasp a conducting ring spaced from a shorting contact member by a thin insulating spacer defining the auxiliary gap thereacross. Here again, the air gap is directly through the insulating material.

All of these devices operate in a similar manner and each device has a common shortcoming. Once the auxiliary arc gap has experienced an overvoltage, it provides a carbonized path which shorts out the two electrodes and therefore shorts the line it is protecting to ground, requiring a service technician to remove the protective device and replace it with a new one. It would be more advantageous to provide an auxiliary arc gap device such as for example a creepage path, which is capable of sustaining a plurality of overvoltage surges, thereby keeping the line open until a service technician is available to replace the defective arrester.

Therefore, it is an object of the present invention to provide a simple, inexpensive device for providing an auxiliary breakdown path in order to protect telephone or other communication lines from overvoltage surges when the gas tube arrester has failed in the open condition.

It is yet another object of the present invention to provide an auxiliary spark gap or a gas tube arrester that is capable of surviving a plurality of overvoltages surges.

It is yet another object of the present invention to provide a reliable backup creepage path device which is easy to install and is in parallel with a gas tube arrester and is readily replaceable therewith.

It is still a further object of the present invention to provide an auxiliary creepage path for use with a gas tube arrester which will not hamper other failsafe devices.

SUMMARY OF THE INVENTION

An overvoltage surge arrester having an auxiliary breakdown path for use in a station protector housing, according to the principles of the present invention, comprises, in combination, a gas tube arrester device having at least two electrically conductive electrodes axially spaced apart by an insulating medium to provide a first spark gap thereacross. The spark gap is provided with a hermetically sealed gaseous environment. One of the conductive electrodes thereof is provided with a retaining device. An elongated conductive electrode extension device is provided with a retaining head on one end and a device for cooperating with and being retained by the electrode retaining device on the other end. A pair of relatively high resistance conductive washers, sandwich an insulating washer therebetween. One of the conductive washers is in intimate electrically conductive contact with the tube electrode retaining device. A second resilient insulating washer and is disposed between the other of the relatively high resistance conductive washers and the electrode extension device retaining head. The internal surfaces of the conductive washers are spaced apart by the first insulating washer with the surfaces of the insulating washer providing a surface creepage path thereacross, which is adapted to break down into an arc discharge path at a voltage less than the breakdown voltage of the gas tube arrester device without its gaseous environment.

According to the principles of the present invention, an auxiliary breakdown path may be added to a conventional gas tube arrester device by providing an elongated conductive electrode extension device having a retaining head on one end and a device for cooperating with and being retained by one of the electrodes of the gas tube device. A pair of relatively high resistance conductive washers, preferably of graphite, may be sandwiched between the conductive washers with one of the conductive washers being in intimate electrically conductive contact with the retaining conductive electrode of the arrester tube. A second insulating washer may be disposed between one of the relatively high resistance conductive washers and the electrode extension device retaining head and assembled so that the internal surfaces of the conductive washers are spaced apart by the first insulating washer to provide a surface creepage path thereacross having an auxiliary breakdown path which is adapted to break down into an arc discharge at a voltage less than the breakdown voltage of the gas tube arrester device without its gaseous environment, the internal surfaces of the conductive washer providing the auxiliary air gap path.

The subject matter which I regard as my invention is particularly pointed out and distinctly claimed in the concluding portion of this specification. The invention, however, both as to organization and method of operation, together with further objects and advantages thereof may best be understood by reference to the following description taken in connection with the accompanying drawing wherein like reference characters refer to like elements.

BRIEF DESCRIPTION OF THE DRAWING

In order that the invention may be more fully understood, it will now be described, by way of example, with reference to the accompanying drawing in which.

DESCRIPTION OF THE PREFERRED EMBODIMENT

Figure 1:
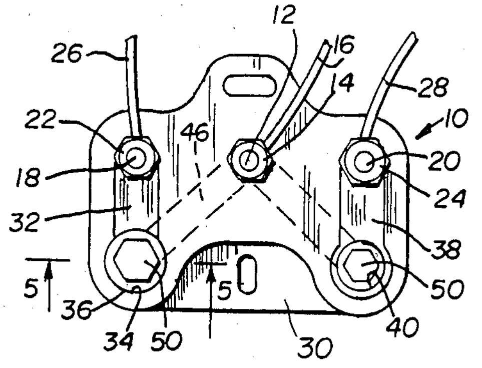
FIG. 1 is a top plan view of a typical telephone station protector wherein each communication line is protected by the overvoltage arrester device with an auxiliary breakdown path, according to the principles of the present invention.

Referring now to the drawing, and in particular to FIG. 1, a station protector 10 embodying the invention includes a threaded ground terminal 12 and a nut and conventional prong and flat washers 14 to which a ground wire 16 is affixed. Two additional threaded terminals 18 and 20 are provided. The terminals have affixed thereon, in a similar manner, nuts 22 and 24 and their associated flat washers to which communication lines 26 and 28, respectively, are connected, in a conventional manner. Terminals 12, 18 and 20 are retained in a conventional manner, in a dielectric or insulated housing 30, which may be fabricated from any number of well-known materials.

The housing 30 is provided with an electrically conductive link 32 which extends from terminal 18 to a well-like aperture 34 provided in the housing. The link 32 extends about the periphery 36 of aperture 34 and extends downwardly into the aperture forming a continuous electrically conductive path from the upper portion of the well-type aperture to the line terminal 18. Aperture 34 is preferably threaded beyond the depth of the conductive link 32. In a similar manner, a conductive link 38 is provided between terminal 20 and well-like aperture 40 which is also threaded below the depth of the link 38. Centrally disposed in apertures 34 and 40, as is clearly shown in FIG. 5, the bottom end is provided with an upwardly extending, electrically conductive button or protrusion 42 which is affixed, in a conventional manner, to an electrical conductor 46 and 48 (which may be combined in one piece) to provide electrical contact to the ground terminal 12.

Figure 2:
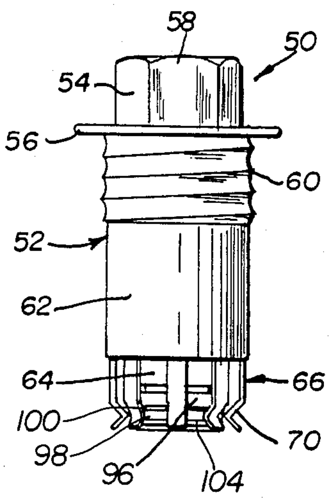
FIG. 2 is end view in elevation of a protector cartridge having an arrester device and an auxiliary breakdown path disposed therein.
Figure 5:
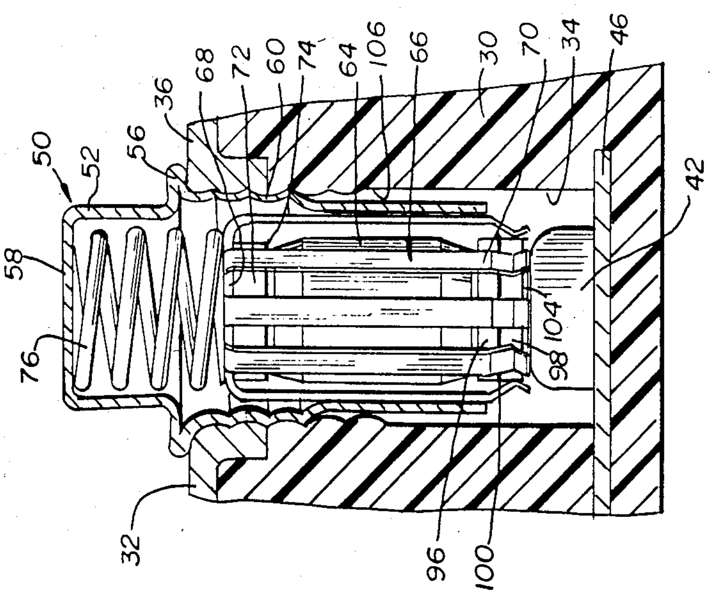
FIG. 5 is an enlarged cross-sectional view partially broken away showing a protector cartridge with an arrester device disposed therein placed in a protector housing.
Figure 4:
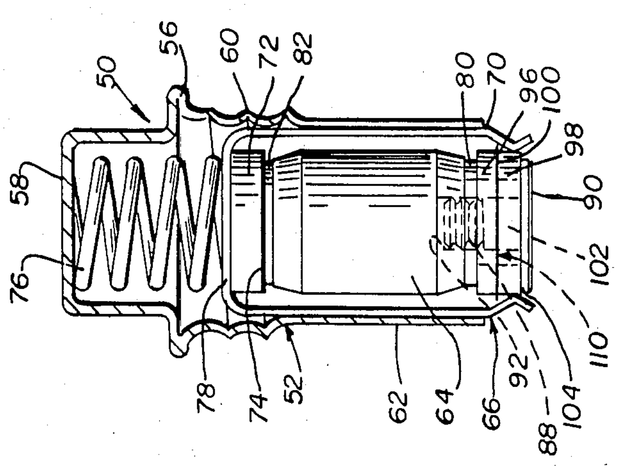
FIG. 4 is an enlarged view partially in cross-section with an arrester tube and auxiliary breakdown path disposed within a protector cartridge.

A protector cartridge 50 appears in partial cross-section in FIG. 4 and is shown in position in a protector well or aperture 34 in FIG. 5. The protector cartridge 50 includes an electrically conductive shell or cap 52 which is provided with a top portion 54 (see FIG. 2) that is hexagonally-shaped, and has an angular radial flange 56 that is axially spaced from an end wall 58. The cartridge 50 further includes a threaded, cylindrically-shaped wall portion 60 and a cylindrical skirt portion 62 adjacent to and extending axially from the threaded portion 60. The skirt portion 62 terminates in an open end which is adapted to receive a protector device 64, which, preferably, is a gas tube arrester manufactured by TII Industries, Inc., known as MN 362 or 364.

The protective device 64 is centrally disposed within a retaining cage 66 which is cylindrically-shaped having a flat end wall 68 with a plurality of fingers 70 extending therefrom and formed to retain the protector device 64 therewithin. Additionally included in the retaining cage 66 are a solder pellet or disc 72 specifically selected to melt with excessive current flowing therethrough because of the excessive heat generated thereby and a heat sink 74 which is utilized to delay for a short period of time the heat generated by an arcover occurring through the arrester 64 from melting the solder disc 72 prematurely. A coil spring 76 (see FIG. 4) acts against an end wall 78 of cage 66 and the end wall 58 of the cartridge 50, thereby urging the cage and its contents beyond the opening provided in the skirt portion 62 of the shell or cap 52 as shown in FIG. 4. The function of the spring 76, together with the solder disc 72 and cooperating components will be described hereinafter.

Figure 3:
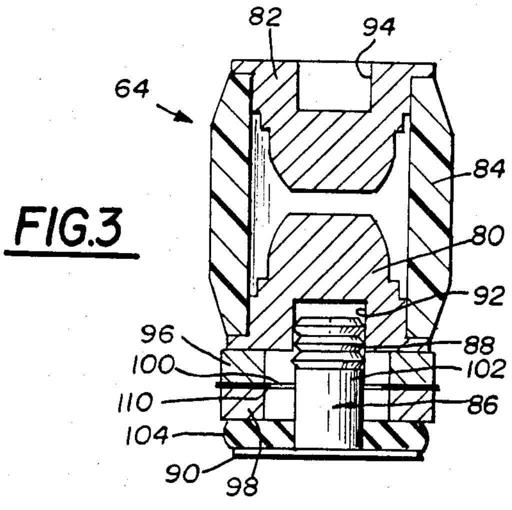
FIG. 3 is an enlarged cross-sectional view in elevation of a typical arrester device with an auxiliary breakdown path disposed therein, according to the principles of the present invention.

Referring now to FIG. 3, which discloses a conventional arrester device 64 that includes a pair of electrically conductive electrodes 80 and 82 axially spaced apart by an insulating body which is hermetically sealed and filled with gas, in a conventional manner, to provide a well-known gas tube arrester as disclosed hereinbefore of the type manufactured by TII Industries, Inc.

An elongated conductive electrode extension device 86 is provided with a knurled portion 88 on one end and a flat disc-shaped head portion 90 on the other end. The diameter of the knurled portion 88 is chosen to be received, by what is commonly known as a force-fit, into aperture 92 or 94 provided in electrodes 80 or 82, respectively. Apertures 92 and 94 function as a receptacle into which the knurled portion 88 may be received. A pair of relatively high resistance conductive washers 96 and 98, preferably fabricated from dust-free graphite having a relatively high resistance and relatively hard, which has sandwiched therebetween a mica washer 100. The thickness of the mica washer 100 is preferably between two and seven mils and has an outside diameter which is greater than the outside diameter of the graphite washers 96 and 98 with an inside diameter that is equal to or slightly smaller than the diameter of the graphite washers 96 and 98. The diameters of the mica washer and graphite washers are much greater than the outer diameter of the knurled portion 88 or center portion 102 of the electrode extension device 102, thereby providing a surface creepage path 110 across the inner surfaces of the graphite washers and the surfaces of the mica washer 110 which are spaced apart by the mica washer 110. The breakover voltage is chosen to rely on the air path rather than through the mica washer, thereby permitting a large number of voltage breakovers before the auxiliary breakdown path requires replacement. Insulating resilient washer 104 is preferably fabricated of rubber and insulates the retaining head 90 from the high resistance conductive washer 98. The other high resistance conductive washer 96 is in intimate electrically conductive contact with the electrode 80 of the arrester 64. Thus, a creepage path 110 in parallel with the arrester 64 is provided when the fingers 70 of the cage 66 contact the conductive washer 98 and the end wall 78 of the cage makes contact with electrode 82 of arrester 64, via solder disc 72 and metal disc 74, as shown in FIG. 4.

As shown in FIG. 4, the cage 66 contains; a solder pellet 72 which is in conductive contact with end wall 78 of cage 66; and a metal heat sink 74 in conductive contact with the solder disc 72 and the electrode 82 of arrester 64. The other electrode 80 has affixed therein the auxiliary breakdown path provided by the electrode extension device 86 which retains the pair of graphite washers 96 and 98 with mica washer 100 sandwiched therebetween and resilient insulator 104. Cage 66 is slidably retained within shell or cap 52 and, with the aid of spring 76, is urged to its fully extended position prior to insertion into the well-like aperture 34 provided in the housing 30 of the station protector 10.

As shown in FIG. 5, which is a partial cross-sectional view taken substantially along the line 5—5 shown in FIG. 1, the protector cartridge 50 is inserted into the aperture 34 and screwed into position by means of the threaded wall portion 60 corresponding with the threaded portion 106 provided in the housing 30, thereby compressing spring 76 and placing the retaining head 90 of the electrode extension device into intimate conductive contact with the button portion of the station protectof 10. The wall portion 60 of the cartridge 50 makes conductive electrical contact with the link 32, thereby placing the gas tube arrester 64 in parallel with the auxiliary breakdown path 110 formed by the inner surfaces of graphite washers 96 and 98 and the surfaces of mica washer 110.

Figure 6:
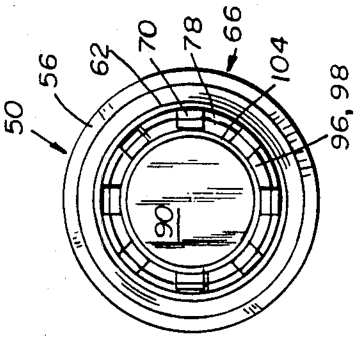
FIG. 6 is a bottom view of the protector cartridge shown in FIG. 4.

FIG. 6 is a bottom view of the protective cartridge 50 with the auxiliary air gap and overvoltage arrester disposed within the cage 66.

In operation, the cartridge 50 with the arrester and auxiliary air gap is screwed into position in the housing 30. A single cartridge is provided for each of the lines to be protected. Should an overvoltage transient occur, the gas tube arrester 64 having the lower breakover voltage would handle the overvoltage and maintain the line at an acceptable voltage level. Should the gas arrester fail in an open mode, the auxiliary breakdown path 110, being in parallel with the gas tube arrester 64, would then attempt to dissipate the overvoltage by providing an arcover creepage path, via the inner walls or surfaces of the graphite washers 96 and 98 and the mica washer 110. The configuration disclosed herein permits multiple arcovers while still providing reliable protection. Since the auxiliary breakdown path will generally not short circuit and cause a short to the line, the line will remain in operation. Should the overvoltage surge cause sufficient heat to be generated by the gas tube arrester during its arcing condition, the solder pellets 72 would melt, thereby causing the spring 76 to urge cage 66 towards the conductive ground button 42. The fingers 70 of cage 66 would come in contact with button 42 once solder disc 72 melted, thereby placing a short between the line terminal 22 and ground terminal 12, via button 42 and conductor 46. A short from the line terminal to the ground terminal will require a service technician to replace the arrester and solder pellet, thereby removing the short from the line to ground.

Hereinbefore has been disclosed an inexpensive efficient device for providing a backup or auxiliary breakdown path for a gas arrester tube that is reliable and capable of sustaining multiple arcover conditions. It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention, what is claimed is:

1. An overvoltage surge arrester having an auxiliary breakdown path for use in a station protector housing comprises, in combination:

a. a gas tube arrester device having at least two electrically conductive electrodes axially spaced apart by insulating means to provide a first spark gap thereacross, said spark gap being provided with a hermetically sealed gaseous environment, at least one of said conductive electrodes having a retainer means;

b. elongated conductive electrode extension means having a retaining head on one end and a means for cooperating with and being retained by said electrode retaining means on the other end;

c. a pair of relatively high resistance conductive washer means having inner and outer diameters, one of said conductive washer means being in intimate electrical conductive contact with said retaining means electrode;

d. first insulating washer means having a smaller inner diameter and a greater outer diameter than said pair of relatively high resistance conductive washer means, said first insulating washer means being sandwiched between said pair of conductive washer means; and e. second insulating washer means disposed between the other of said relatively high resistance conductive washer means and said electrode extension means retaining head, the internal surfaces of said pair of conductive washer means and the surfaces of said first insulating washer means providing thereacross a surface creepage path adapted to break down into an arc discharge at a voltage less than the breakdown voltage of said gas tube arrester device without its gaseous environment.

2. An overvoltage surge arrester according to claim 1 wherein said first insulating washer means is non-resilient and said second insulating washer means is resilient.

3. An overvoltage surge arrester according to claim 2 wherein the internal diameter of said resilient washer means is approximately equal to said electrode extension means outside diameter.

4. An overvoltage surge arrester according to claim 1 wherein the internal diameters of said first insulating washer means and said pair of conductive washer means are much greater than the outside diameter of said electrode extension means and the outside diameter of said first insulating washer means is greater than the outside diameter of said conductive washer means.

5. An overvoltage surge arrester according to claim 4 wherein said pair of relatively high resistance conductive washer means are each graphite.

6. An overvoltage surge arrester according to claim 4 wherein said first insulating washer means is mica and said second insulating washer means is rubber.

7. An overvoltage surge arrester according to claim 1 wherein said electrode retaining means is a receptacle, said electrode extension means end is knurled and is adapted to be received by said receptacle.

8. In an overvoltage surge arrester, having a gas tube arrester device including a pair of electrodes for use in a station protector housing, the improvement of adding an auxiliary breakdown path comprising:

a. elongated conductive electrode extension means having a retaining head on one end and a means for cooperating with and being retained by one of the electrodes of said gas tube device;

b. a pair of relatively high resistance conductive washer means having inner and outer diameters, one of said conductive washer means being in intimate conductive contact with said one retaining conductive electrode;

c. first insulating washer means having a smaller inner diameter and a greater outer diameter than said pair of relatively high resistance conductive washer means, said first insulating washer means being sandwiched between said pair of conductive washer means; and d. second insulating means disposed between one of said relatively high resistance conductive washer means and said electrode extension means head, the internal surfaces of said pair of conductive washer means and the surfaces of said first insulating washer means providing thereacross a surface creepage path adapted to break down into an arc discharge at a voltage less than the breakdown voltage of said gas tube arrester device without its gaseous environment.

9. An overvoltage surge arrester according to claim 8 wherein said first insulating washer means is non-resilient and said second insulating washer means is resilient.

10. An overvoltage surge arrester according to claim 9 wherein the internal diameter of said resilient washer means is approximately equal to said electrode extension means outside diameter.

11. An overvoltage surge arrester according to claim 10 wherein said pair of relatively high resistance conductive washer means are each graphite.

12. An overvoltage surge arrester according to claim 10 wherein said first insulating washer means is mica and said second insulating washer means is rubber.

13. An overvoltage surge arrester according to claim 8 wherein the internal diameters of said first insulating washer means and said pair of conductive washer means are much greater than the outside diameter of said electrode extension means and the outside diameter of said first insulating washer means is greater than the outside diameter of said conductive washer means.

14. An overvoltage surge arrester apparatus for protecting communication lines from voltage surge comprising:

a. a housing of insulating material having at least one well-type aperture disposed therein, said well-type aperture being provided with a first electrode adapted to be connected to a ground and disposed at the closed end thereof having an upwardly extending portion and a second electrode disposed about the periphery of the open end of said well-type aperture, said second electrode being adapted to be connected to one of said communication lines;

b. a tubular cap, adapted to be received into said well-type aperture;

c. an electrically conductive cage telescoped within said cap coaxial therewith and axially slidable relative thereto, said cage having an end wall and a plurality of axially extending circumferentially spaced fingers extending from said end wall;

d. a sealed gas tube arrester device having at least two electrically conductive electrodes axially spaced apart by insulating means and sealed together having a gaseous internal environment to provide a breakdown path theracross, said arrester being disposed within said cage and substantially coaxial therewith, one electrode of said gas tube arrester being in electrical conductive contact with said cage;

e. elongated conductive electrode extension means having a retaining head on one end and means for cooperating with and being retained by the other of said arrester electrodes;

f. a pair of relatively high resistance conductive washer means having inner and outer diameters, one of said conductive washer means being in intimate conductive contact with said other gas tube electrode;

g. first insulating washer means having a smaller inner diameter and a greater outer diameter than said pair of relatively high resistance conductive washer means, said first insulating washer means being sandwiched between said pair of conductive washer means for providing a surface creepage path; and h. second insulating washer means disposed between the other of said relatively high resistance conductive washer means and said electrode extension means retaining head, said electrode extension means head being in electrical conductive contact with said first housing electrode and said cage fingers being in electrical conductive contact with the other of said conductive washer means.

15. An overvoltage surge arrester apparatus according to claim 14 further including spring means disposed between said cage end wall and said tubular cap.

16. An overvoltage surge arrester apparatus according to claim 14 further including a disc of a relatively low melting point material within said cage disposed between said cage end wall and said arrester first electrode.

17. An overvoltage surge arrester apparatus according to claim 16 further including a heat sink disc disposed between said arrester first electrode and said disc of low melting point material.

* * * * *

UNITED STATES PATENT AND TRADEMARK OFFICE

CERTIFICATE OF CORRECTION

PATENT NO. : 4,603,368

DATED : July 29, 1986

INVENTOR(S) : Emanuel J. Pagliuca

It is certified that error appears in the above-identified patent and that said Letters Patent is hereby corrected as shown below:

In the Title:

[54] Delete "AIR GAP" and insert therefor --BREAKDOWN PATH--.

In the Specification:

Column 1, lines 1 and 2; delete "AIR GAP" and insert therefor --BREAKDOWN PATH--.

Signed and Sealed this

Fourteenth Day of October, 1986

[SEAL]

*Attest:*

DONALD J. QUIGG

*Attesting Officer*

*Commissioner of Patents and Trademarks*